Dec. 14, 1954
W. SICHAK ET AL
2,697,209
TUNABLE BAND PASS FILTER
Filed July 13, 1951
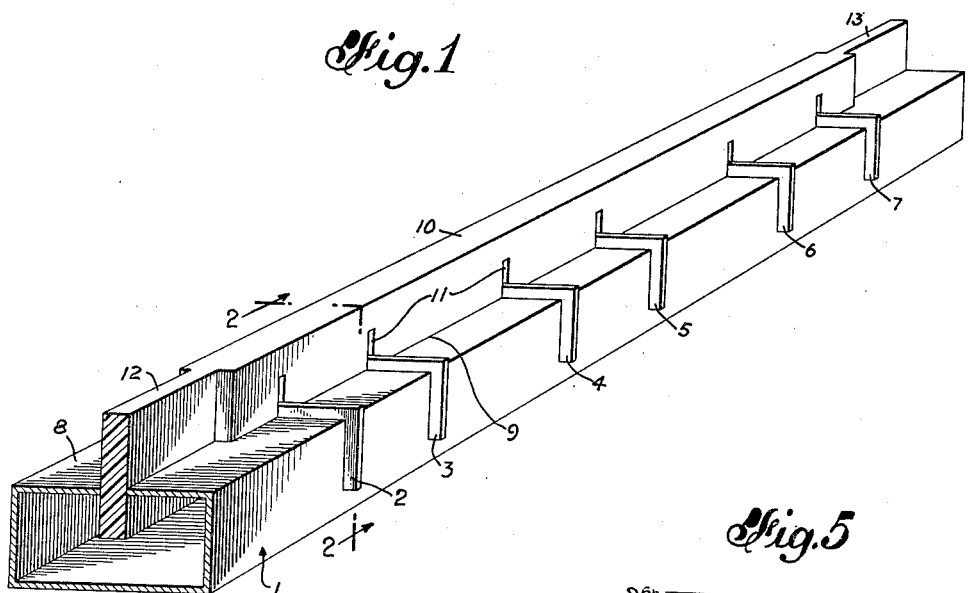
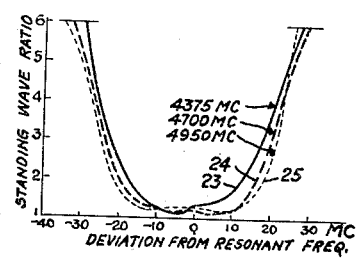
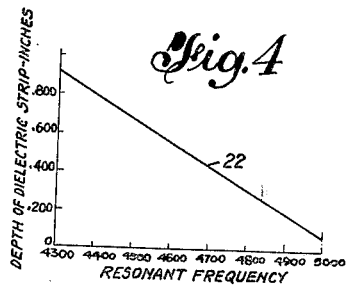
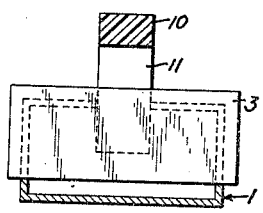
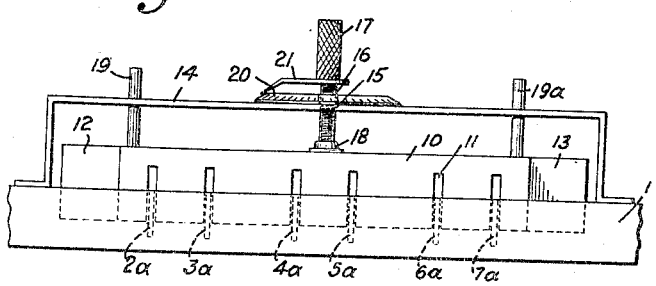
INVENTORS
WILLIAM SICHAK
HARRY A. AUGENBLICK, JR
BY
ATTORNEY

United States Patent Office 2,697,209
Patented Dec. 14, 1954

2,697,209

TUNABLE BAND PASS FILTER

William Sichak, Lyndhurst, and Harry A. Augenblick, Jr., South Orange, N. J., assignors to International Telephone and Telegraph Corporation, a corporation of Maryland Application July 13, 1951, Serial No. 236,576

9 Claims. (Cl. 333—73)

This invention relates to wave guide structures for microwaves and more particularly to band pass filters of the wave guide type.

Band pass filters of the fixed tuned type for microwaves have been built heretofore and worked satisfactorily at a given frequency. It has been proposed to tune such filters by locating tuning posts or lumped susceptance in each cavity of the filter. Such methods of tuning, however, result in the pass-band response becoming asymmetrical as the filter is tuned in either direction away from the design frequency. Thus, lumped susceptance tuning methods limit the filter objectionably to narrow frequency ranges.

One of the objects of this invention is to provide a tunable filter having a band pass characteristic which exhibits symmetrical pass-band response and essentially constant band width throughout the tuning range.

Another object is to provide a tunable filter in which the resonant frequency may be varied while preserving the design characteristics of the filter.

Still another object of the invention is to provide a tunable wave guide filter having a means for varying at least one of the parameters of the wave guide in such a manner that the guide wave length at resonance is substantially constant.

One of the features of the invention is that the constant guide wavelength filter characteristics of the tunable filter provides for easy coupling to transmission lines which remain substantially tuned over the entire frequency range of the filter. Thus, there is substantially no asymmetrical response tending to introduce mismatch to the coupling transmission lines with which the filter is associated. Another feature is that the filter may be tuned by a single control which is easily calibrated.

Briefly, the preferred embodiment of the invention comprises a wave guide whose guide wavelength is changed capacitively by the presence of a dielectric strip adapted to be adjusted at any desired depth in a slot cut in the broad face of the wave guide section. The filter is designed to operate at the highest desired frequency when the strip is completely out of the guide. To tune the filter to a lower desired frequency, the dielectric strip is adjusted in depth of insertion in the wave guide. The dielectric strip is made wide enough so that the guide wavelength, with the strip almost all the way across the guide at the lowest desired frequency, is the same as the design guide wavelength. Also, rather simple matching transformers are provided which are capable of coupling the sections to transmission lines and other microwave apparatus. A good approximation to the constant bandwidth can be obtained by using half- or quarter-wavelength transformers between the constant guide wave length filter and the rectangular form of waveguide.

The above mentioned and other features and objects of the invention and the manner of obtaining them will become more apparent by reference to the following description taken in conjunction with the accompanying drawings, wherein:

Fig. 1 is a view in perspective of a tunable wave guide filter in accordance with the principles of this invention;

Fig. 2 is a cross-sectional view taken along line 2—2 of Fig. 1;

Fig. 3 is a view in side elevation of the filter showing means for manually tuning the filter;

Fig. 4 shows a resonant frequency response curve for the filter; and

Fig. 5 shows a set of curves showing deviation from resonant frequency.

Referring to Figs. 1 and 2 of the drawing, the illustrated embodiment of the invention is shown to comprise a rectangular wave guide section 1 along which microwave energy may be propagated in the $TE_{1,0}$ mode. The filter section is provided with a series of capacitive irises in the form of conductive plates 2, 3, 4, 5, 6, and 7 spaced to provide a three-element or cavity filter. The irises are arranged in pairs, 2, 3, 4, 5 and 6, 7, each pair being spaced apart a distance equal substantially to slightly more than one-half wavelength of the resonant frequency. The pairs of irises are spaced apart by a distance equal substantially to three-quarters of a wavelength of the resonant frequency for which the filter is designed. The upper wall 8 of the wave guide section 1 is provided with a longitudinal slot 9 to receive a strip 10 of dielectric material such as polystyrene, polyethylene, Teflon or other high quality dielectric, which provides a variable capacitance. The strip has transverse slots 11 to accommodate the irises. The ends of the strip are reduced in thickness as indicated at 12 and 13 to form transformer sections to minimize perturbation of the waves at the ends of the filter. The length of the transformer end portions 12 and 13 are substantially a quarter wavelength long.

In Fig. 3 the filter is shown in a form provided with a manual control for determining the depth of the dielectric strip 10 within the guide section 1. The same reference characters are used in Figs. 1, 2, and 3 to indicate corresponding parts.

The irises in Fig. 3 are shown to be contained within the wave guide 1 and are indicated by the reference characters 2a, 3a, 4a, 5a, 6a, and 7a. The showing of the irises as extending outside the surface of the wave guide in Figs. 1 and 2 merely illustrates better the location of the irises. In a commercial model the irises are contained entirely within the wave guide structure substantially as indicated in Fig. 3.

The wave guide section 1 is provided with a bracket 14 having a threaded boss 15 to receive the threaded shank 16 of a manually adjustable member 17 which is swivelly connected at 18 to the strip 10, whereby the depth position of the dielectric strip 10 may be adjusted. The end portions of the strip 10 are provided with two guiding posts 19 and 19a which are received through openings in the bracket 14 to maintain proper alignment. On the bracket is a calibrated dial 20 and carried by the member 17 is a pointer 21, whereby the depth of the strip and the tuned condition of the filter are readily determined.

In one example of the filter the dielectric strip was selected of polystyrene a quarter inch thick, for a three-cavity filter such as shown in Fig. 1. The filter was designed to resonate at 5050 mc. per second. Each cavity was designed to have a band width of 84 mc. so that the band width of the entire filter would be 65 mc. In Fig. 4 the resonant frequency is plotted against the depth of the dielectric strip showing that a straight slope 22 is obtained. In Fig. 5 the measured standing wave ratio in the pass band with the filter tuned to three different frequencies is indicated by the curves 23, 24, and 25. Very little radiation loss is experienced with this type of filter. The slot strip tolerances, however, should be close to minimize radiation loss.

It will be clear that a tunable wave guide filter in accordance with the principles of this invention has substantially constant band width by using a variable depth dielectric strip to keep the guide wave length in the filter constant as the resonant frequency is changed. Single knob tuning and the calibration of the tuning dial with a linear frequency scale is also an important feature. Another feature is that a filter so tuned to maintain constant guide wave length, will exhibit symmetrical pass band response and essentially constant band width. The dielectric strip tuning feature also provides constant band width with a straight line frequency tuning curve over a relatively wide frequency range.

While we have described above the principles of our invention in connection with a specific example, it is to be clearly understood that this description is made by way of example only and not as a limitation of the scope

We claim:

1. A band pass microwave filter comprising a section of a waveguide, a series of irises spaced apart lengthwise of said waveguide section, a strip of dielectric material, said strip having slots disposed transversely thereof and in alignment with respective ones of said irises with a length of said strip extending beyond the end irises of said series, and means disposing said strip at least partially within and lengthwise of said waveguide section with portions of said strip between said irises, said strip determining capacitively the guide wavelength in said section.

2. A band pass microwave filter according to claim 1, wherein the ends of said strip beyond said end irises are smaller in one cross-sectional dimension than the remaining portion of said strip.

3. A band pass microwave filter comprising a section of a waveguide, a pair of irises spaced apart lengthwise of said waveguide section, a strip of dielectric material, and means disposing said strip at least partially within and lengthwise of said waveguide section between said irises, said strip determining capacitively the guide wavelength in said section, and the ends of said dielectric strip being extended beyond said irises, each end having a part which is narrower than the remaining portion of the strip.

4. A band pass microwave filter comprising a length of wave guide, pairs of irises spaced at intervals along said wave guide, each pair being spaced apart a distance equal substantially to slightly more than one-half wavelength of the resonant frequency and the pairs of irises being spaced apart by a distance equal to substantially three-quarters of a wavelength of said resonant frequency and a strip of dielectric extending lengthwise of said wave guide and having portions extending into said wave guide in the spaces between said irises.

5. A band pass microwave filter according to claim 4, further including means for adjusting the depth that said dielectric portions are disposed within said spaces to determine the resonant frequency of the filter.

6. A band pass microwave filter comprising a section of a waveguide, a pair of irises spaced apart lengthwise of said waveguide section, a strip of dielectric material, and means disposing said strip at least partially within and lengthwise of said waveguide section between said irises, said strip determining capacitively the guide wavelength in said section, said strip including end sections extending beyond the end-most irises, said ends having a different width for at least part of their length to act as matching transformers.

7. A band pass microwave filter according to claim 6, wherein said end sections of said strip are equal substantially to one-quarter wavelength of the mid-resonant frequency.

8. A tunable band pass microwave filter comprising a length of wave guide, a series of irises spaced at transverse points along said wave guide to provide series coupled resonant cavities, said wave guide section having a longitudinal slot in one wall thereof, a dielectric strip disposed in said slot for movement transversely of said wave guide, said strip having slots disposed transversely thereof and in alignment with respective ones of said irises, and means for adjusting the position of said strip to determine the depth said irises are received in said slots.

9. A tunable band pass microwave filter according to claim 8 wherein said means includes a bracket carried by said wave guide section, said bracket having a threaded boss, a threaded member swivelly connected to said strip and threadibly engaged in said boss, whereby turning movement of said member is adapted to move said strip relatively to said guide.

References Cited in the file of this patent

UNITED STATES PATENTS

| Number | Name | Date |
|---|---|---|
| 2,415,242 | Hershberger | Feb. 4, 1947 |
| 2,546,742 | Gutton et al. | Mar. 27, 1951 |
| 2,567,748 | White | Sept. 11, 1951 |
| 2,605,413 | Alvarez | July 29, 1952 |

FOREIGN PATENTS

| Number | Country | Date |
|---|---|---|
| 591,369 | Great Britain | Aug. 15, 1947 |
| 933,841 | France | Jan. 5, 1948 |

OTHER REFERENCES

Publication I, "Microwave Transmission Circuits" by Ragan, vol. 9 of Radiation Laboratory Series published by McGraw-Hill in 1948, page 494 relied on; pp. 677–706 of interest. (Copy in Div. 69.)